United States Patent
Hemrle et al.

(10) Patent No.: US 12,296,703 B2
(45) Date of Patent: May 13, 2025

(54) ELECTRICAL VEHICLE CHARGING SYSTEM FOR CHARGING AN ELECTRICAL VEHICLE

(71) Applicant: ABB E-mobility B.V., Delft (CH)

(72) Inventors: Jaroslav Hemrle, Baden-Dättwil (CH); Emmanuel Logakis, Baden-Dättwil (CH); Matteo Bortolato, Trebaseleghe (IT); Francisco Garcia-Ferre, Baden (CH)

(73) Assignee: ABB E-mobility B.V., Delft (NL)

( * ) Notice: Subject to any disclaimer, the term of this patent is extended or adjusted under 35 U.S.C. 154(b) by 559 days.

(21) Appl. No.: 17/582,611

(22) Filed: Jan. 24, 2022

(65) Prior Publication Data

US 2022/0144115 A1     May 12, 2022

Related U.S. Application Data

(63) Continuation of application No. PCT/EP2020/070772, filed on Jul. 23, 2020.

(51) Int. Cl.
*B60L 53/302* (2019.01)
*B60L 53/10* (2019.01)
(Continued)

(52) U.S. Cl.
CPC ............. *B60L 53/302* (2019.02); *B60L 53/11* (2019.02); *B60L 53/16* (2019.02); *B60L 53/18* (2019.02);
(Continued)

(58) Field of Classification Search
CPC ........ B60L 53/302; B60L 53/11; B60L 53/16; B60L 53/18; B60L 53/14; H01B 7/423;
(Continued)

(56) References Cited

U.S. PATENT DOCUMENTS

| 6,063,998 A | 5/2000 | Rolf et al. |
| 2009/0167078 A1 | 7/2009 | Watanabe |

(Continued)

FOREIGN PATENT DOCUMENTS

| CA | 3038237 A1 | 3/2018 |
| CN | 1175777 A | 3/1998 |

(Continued)

OTHER PUBLICATIONS

European Patent Office, Extended European Search Report in European Patent Application No. 19188292.7, 7 pp. (Jan. 30, 2020).

(Continued)

*Primary Examiner* — Nha T Nguyen
(74) *Attorney, Agent, or Firm* — Leydig, Voit & Mayer, Ltd.

(57) ABSTRACT

A system and method for a liquid cooled cable arrangement for high-power fast charging of electric vehicles includes a charging connector and a liquid cooled charging cable. The cable comprises several insulated positive and negative conductors for supplying charging current, an inner fluid channel and an outer fluid channel surrounding the inner fluid channel. The positive and negative conductors are arranged within the inner fluid channel. The charging connector includes at least a positive contact electrically connected to the positive conductors by a first connecting element, and a negative contact electrically connected to the negative conductors by a second connecting element. The first and second connecting elements include a thermally conductive and electrically conductive material and are electrically isolated from each other. The first and second connecting elements are thermally connected to the inner and outer fluid channels.

15 Claims, 3 Drawing Sheets

(51) Int. Cl.
*B60L 53/16* (2019.01)
*B60L 53/18* (2019.01)
*H01B 7/42* (2006.01)
*H01R 13/00* (2006.01)

(52) U.S. Cl.
CPC ........... *H01B 7/423* (2013.01); *H01R 13/005* (2013.01); *H01R 2201/26* (2013.01)

(58) Field of Classification Search
CPC ... H01R 13/005; H01R 2201/26; Y02T 10/70; Y02T 10/7072; Y02T 90/12; Y02T 90/14
See application file for complete search history.

(56) References Cited

U.S. PATENT DOCUMENTS

| | | | |
|---|---|---|---|
| 2017/0338006 A1* | 11/2017 | Gontarz | B60L 3/00 |
| 2018/0158572 A1 | 6/2018 | Ernst et al. | |
| 2020/0303093 A1* | 9/2020 | Cantz | H01R 9/11 |
| 2020/0350098 A1* | 11/2020 | Neumann | F16L 53/70 |
| 2022/0250490 A1* | 8/2022 | Fuehrer | H01R 13/6683 |

FOREIGN PATENT DOCUMENTS

| | | |
|---|---|---|
| CN | 1525494 A | 9/2004 |
| CN | 108701513 A | 10/2018 |
| CN | 109923623 A | 6/2019 |
| CN | 110040005 A | 7/2019 |
| DE | 102010050562 B3 | 4/2012 |
| DE | 102016206300 A1 | 10/2017 |
| DE | 102016117011 A1 | 3/2018 |
| EP | 3043421 A1 | 7/2016 |
| JP | 2012-238532 A | 12/2012 |
| WO | WO 2017/133893 A1 | 8/2017 |
| WO | WO 2017/178321 A1 | 10/2017 |

OTHER PUBLICATIONS

European Patent Office, International Preliminary Report on Patentability in International Patent Application No. PCT/EP2020/070772, 7 pp. (Jan. 25, 2022).

European Patent Office, International Search Report in International Patent Application No. PCT/EP2020/070772, 4 pp. (Oct. 2, 2020).

European Patent Office, Written Opinion in International Patent Application No. PCT/EP2020/070772, 6 pp. (Oct. 2, 2020).

The Patent Office of the People's Republic of China, Office Action in Chinese Patent Application No. 202080053123.5, 7 pp. (Mar. 29, 2024).

* cited by examiner

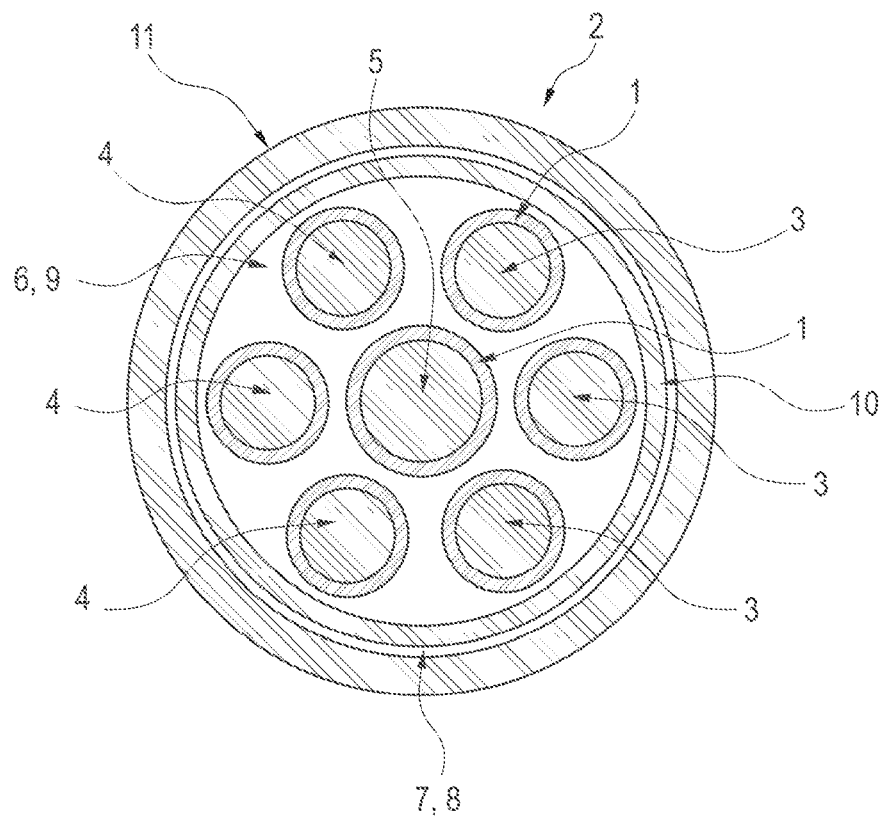
Fig. 1
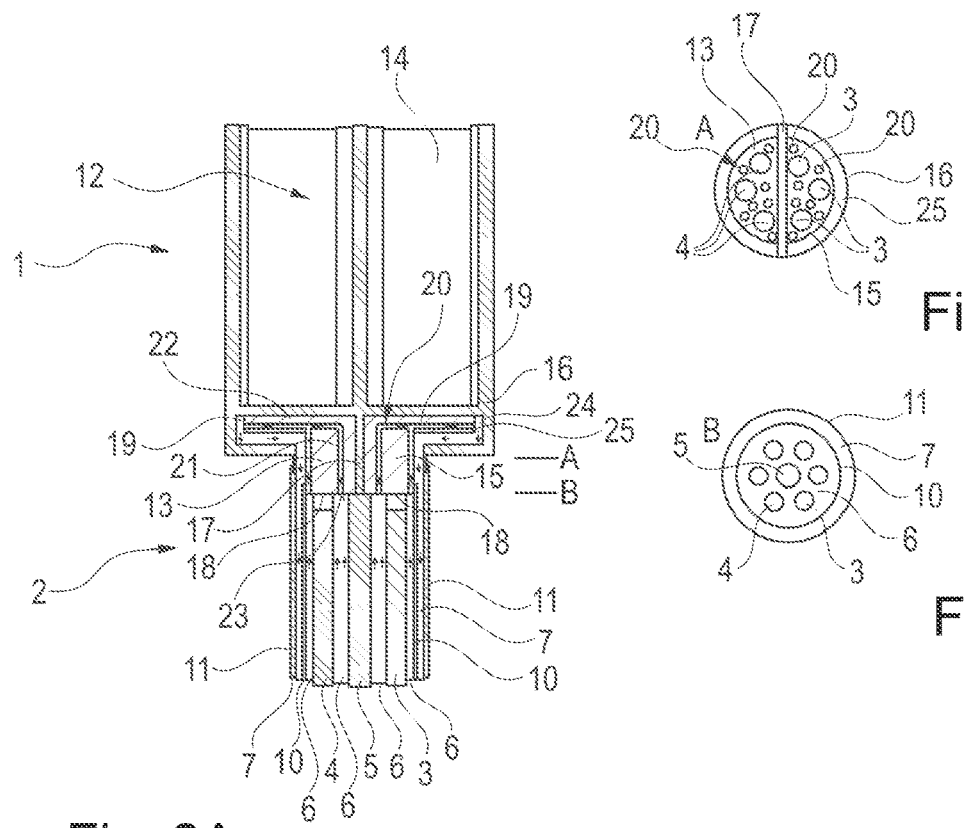
Fig. 2A
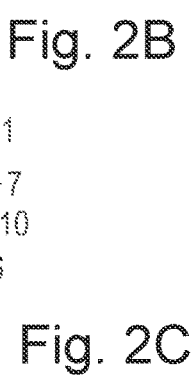
Fig. 2B
Fig. 2C

ELECTRICAL VEHICLE CHARGING SYSTEM FOR CHARGING AN ELECTRICAL VEHICLE

CROSS-REFERENCE TO RELATED APPLICATIONS

This patent application claims priority to European patent application 19188292.7, filed on Jul. 25, 2019, and to International patent application no. PCT/EP2020/070722, filed on Jul. 23, 2020, which are incorporated by reference.

FIELD OF THE DISCLOSURE

The invention relates to a liquid cooled cable arrangement for high-power fast charging of electric vehicles.

BACKGROUND OF THE INVENTION

For high power charging of electric vehicles, EVs, typically a liquid cooled charging arrangement is used to provide adequate heat removal during charging. Such a charging arrangement generally comprises a charging cable, including a plurality of conductors and a charging connector, wherein power contacts are located.

The cable itself comprises multiple conductors, specifically three conductors per DC polarity and additionally one conductor providing a ground connection. The conductors are insulated to prevent mutual contact of conductive parts. For dielectric or mechanical reasons the charging cable may comprise additional parts.

To remove heat generated by Joule effect both in the charging cable and in the charging connector, it is known to provide a cooling by guiding a flow of cooling liquid from a cooling unit, typically located inside or outside a charge post, through the charging cable and the connector back to the cooling unit, where the heat provided to the coolant by Joule effect is preferably dissipated to the sur-rounding ambient air or alternatively for example to cooling water, to a refrigeration circuit, or to external heat load as waste heat utilization. For this reason, in a known charging cable the conductors are arranged in an inner part of the cable, which inner part provides a first cooling channel for the cooling fluid. The inner part is enclosed by a tight sheath. On the outer side of the sheath the charging cable comprises a second channel for the cooling fluid, which second channel again is enclosed by a sheath surrounding the entire cable. The flow of the cooling fluid is primarily assumed to be directed so that the outer fluid space is used for the fluid to flow from a charging post towards the end connector, and back through the inner fluid volume. However, an opposite orientation of the fluid flow generally may also be provided.

Such liquid cooling is necessary for high-current fast EV chargers, mainly because the liquid cooling avoids other necessary use of bulky charging conductors which would make the charging cable very difficult to handle. Furthermore, the liquid cooling in the charging cable must be designed to meet the clause reported in standard IEC 62196-1, which limits temperature rise of electrical terminals in the charging connector to 50 K maximum.

For example, US 2018/0158572 A1 discloses a heavy-current charging cable which has an outer jacket, a number of heavy current cores which extend in the longitudinal direction, and at least one cooling jacket with at least one hollow chamber extending in the longitudinal direction for conducting a coolant.

US 2009/0167078 A1 discloses a vehicle conductor for use with an electric auto-mobile, comprising a protection pipe, including at least one wire in the protection pipe capable of supplying power, and a cooling pipe positioned proximate the at least one wire in the protection pipe.

In a liquid cooled charging cable, within a common charging cable length range from 4 m to 6 m, the contact resistance between the power contacts of the charging cable's connector and mating contacts in a car socket is typically a few percent of the ohmic resistance of the conductors. Hence, when charging an EV at 500 A, heat generated in each power contact of the charging connector is negligible as compared to the total heat generated through the conductors' length. Nevertheless, in prior art, for cost-effectiveness reasons, geometry of the power contacts did not change in low power charging cables such as up to 200 A and in high power charging cables such as up to 500 A as of today. When charging an EV at 500 A, even in a cooled charging cable, a very high temperature gradient between 20° C. and 30° C. is expected along the power contacts in the charging connector.

Moreover, in existing solutions, the power contacts are electrically connected to the conductors through a very small area, for example crimped, and the coolant path surrounds or is embedded within that small area. This means that, in existing configurations, when charging at high currents, a very large heat flux, i.e. heat load divided by area, must be removed from the power contacts. As a consequence, there is a need for cooling not only the charging cable, but also the charging connector.

In this regard DE 10 2016 206 300 A1 discloses a charging connector which has at least one liquid cooled power contact arranged in a charging connector housing. The liquid cooled power contact has a first connection area, accessible via a contact side of the charging connector housing, for direct electrical connection to an electrical power recipient and a second connection area directly electrically connected to a charging cable. The connector additionally has at least one charging cable cooling device that is fluid-connected to a cooling fluid line. The charging connector has a bypass supply line and a bypass return line fluid-connected thereto. The bypass supply line and the bypass return line are respectively fluid-connected to the cooling fluid line, so that a stream of cooling fluid from the cooling fluid line via the bypass supply line to the bypass return line back to the cooling fluid line is made possible. The bypass ports allow the flow into a power contacts cooling device.

DE 10 2010 050 562 B3 discloses a vehicle connector plug wherein cooling devices in form of a refrigerator and coolant pipes are thermally coupled with the plug for cooling a portion of the plug. The cooling devices are closed when separated from the plug. The plug has a coupling portion and a handle portion. The cooling devices comprise channels that are guided through the handle portion. The cable is held at partially tube-like channels of the cooling devices by a com-mon cover.

DE 10 2016 117 011 A1 discloses an electrically conductive contact element for an electrical plug connector, which contact element comprises a cooling cavity having a distal opening to be fluidic connected to a distal opening of a radially inner tube of a charging cable.

A drawback of prior art liquid cooled charging connectors is an insufficient thermal performance of the cooling system.

BRIEF SUMMARY OF THE INVENTION

In one aspect, the present disclosure describes a charging connector for charging an electrical vehicle that overcomes the drawbacks explained before, in particular to provide a charging connector which topologically matches the charging cable described in this document and enables an appropriate dielectric design and the required electric properties. Additionally, the invention should provide a suitable, ideally very good, cooling of the cable and the connector itself, ensuring that the temperature of the charging connector and its contacts meets the requirements, as well as good manufacturability, reasonable price, weight, reliability and other operation properties.

In one embodiment, a liquid cooled cable arrangement for high-power fast charging of electric vehicles, comprises:
a charging connector and a liquid cooled charging cable, wherein the liquid cooled charging cable comprises several insulated positive conductors and several insulated negative conductors for supplying charging current and an inner fluid channel and an outer fluid channel surrounding the inner fluid channel, the inner fluid channel and the outer fluid channel together providing a supply path and a return path for liquid coolant,
wherein the positive conductors and the negative conductors are arranged within the inner fluid channel,
wherein the charging connector comprises at least a positive contact electrically connected to the positive conductor by a first connecting element and a negative contact electrically connected to the negative conductor by a second connecting element,
wherein the first connecting element and the second connecting element each consist of a thermally conductive and electrically conductive material and are electrically isolated from each other, and
wherein the first connecting element and the second connecting element each are thermally connected to the inner channel and the outer channel of the charging cable, such that heat generated in the contacts during charging can be removed by the liquid coolant.

In one aspect, the present disclosure contemplates that a maximum operating temperature of the contact elements is reduced as compared to existing solutions known from prior art. In the charging connector by said first connecting element and said second connecting element a heat transfer area between the contacts and the coolant fluid is increased and removal of heat from the contact elements advantageously can be maximized. In result, said first and second connecting elements each act as a very effective heat sink, removing heat energy form the contact elements and guiding the heat very effectively to the coolant fluid. The contacts, also referred to as power contacts, are for this purpose not directly electrically connected to the conductors but rather indirectly through the first and the second connecting elements, provided for example as metal blocks. The first and the second connecting elements are preferably made by copper or aluminum. Thus, use of first and the second connecting elements enhances the heat transfer area between the contacts and the coolant, thereby allowing higher current rates such as 600 A that could be considered in future standards for liquid cooled charging cables. The solution advantageously reduces contacts resistance and thermal losses, while durability of the contacts over time is increased. Lower temperature also leads to the use of a more reliable, compact and cost-effective cooling unit in a charge post, such as an EVSE, while complying with present limitation imposed by IEC 62196 standard on the maximum temperature rise of electrical terminals/contacts in a charging cable's charging connector.

The proposed solution for reducing the maximum temperature on the contacts is beneficial for in particular three main reasons. First, since electrical resistance of the contacts increase with temperature, a lower temperature of the contacts implies lower thermal losses due to Joule effect. Second, a lower maximum working temperature increases the reliability and durability of the contacts, which must survive a high number of mating cycles. The higher the maximum working temperature, the softer the copper of the contacts becomes over time. If the material of the contacts becomes softer, their elastic behaviour is affected, and the contact provided with pins of an electric vehicle socket during charging becomes weaker. This in turns increases the electrical resistance and the thermal losses. Third, no performance de-rating is needed at high ambient air temperature.

The liquid cooled cable arrangement can be used as part of an electric vehicle supply equipment, EVSE, also referred to as electric vehicle, EV, charging station, electric recharging point, charging point, charge point, charge post or electronic charging station, ECS. The EVSE is an element in an infrastructure that supplies electric energy for recharging of electric vehicles, including electric cars, neighbourhood electric vehicles and plug-in hybrids. EVSEs usually comply with standards for electric vehicle fast charging, such as the so-called Combined Charging System, CCS, protocol according to IEC 61851-23 and SAE J1772 standard for charging electric vehicles both in the US and in the European Union, EU. The Combined Charging System, CCS, protocol is a fast charging method for charging electric vehicles delivering high-voltage direct current via a charging connector derived from SAE J1772 standard (IEC Type 1) or IEC Type 2 connector. Automobile manufactures that support CCS include Jaguar, Volkswagen, General Motors, BMW, Daimler, Ford, FCA, Tesla and Hyundai. The CSS standard is controlled by the so called CharIN consortium. Besides other protocols such as, for example, CHAdeMO, as abbreviation of CHArge de Move, or GB/T, in particular according to 20234.3-2011 standard. The proposed solution can be advantageously used with even higher charging currents such as more than 500 A or 600 A and/or in combination with newer standards not yet defined requiring higher currents. Numerical analysis on thermal performance of the proposed arrangement showed that a maximum temperature rise of the contacts, which are also referred to as power contact elements, during a charge session at 500 A to 600 A is below 42 K in an ambient temperature range from −40° C. to +55° C. With low viscosity synthetic fluids as cooling liquids, in the foreseen flow rate range, the maximum pressure drop in the charging connector is around 2 or even below 1.2 bar.

According to a preferred implementation, the first connecting element and the second connecting element each comprise fluid channels fluidically connecting the inner fluid channel and the outer fluid channel of the charging cable, such that heat generated in the contacts during charging can be removed by the liquid coolant. The fluid channels of the first connecting element and/or the second connecting element are preferably connected to the outer fluid channel and/or the inner fluid channel by means of gluing, through push-in fittings and/or compression fittings. The fluid channels of the first connecting element and/or the second connecting element preferably are machined, which does not provide a significant cost addition for manufacture, as generally the contact elements require machining. Alternatively, the first connecting element and the second connecting element may each be 3D-printed, which is an advantageous solution if they are to be manufactured with complex internal channels for a very efficient heat transfer. The same applies to the contact elements.

According to a preferred implementation, the first connecting element and the second connecting element each comprises a charging cable mating part for connection with the charging cable and a contact element mating part for connection with the concerning contact element, wherein the contact element mating part has a wider radial extension than the charging cable mating part. Further, the mating parts may each be in essentially half-cylindrical formed. By providing the contact element mating part with a large radial extension, there is a large surface area available for heat transfer from the contact elements to the connecting elements.

In a further preferred implementation, the fluid channels in the first connecting element and/or the second connecting element each consist of an axial channel part and a radial channel part. The axial channel part preferably is open towards an axial surface of the connecting element. The radial channel part preferably is open towards a radial surface of the connecting element. Additionally, the axial channel part and the radial channel part are fluidically connected to each other. By providing such channel geometry the surface/part/section of the connecting element contacting the electric contact to be cooled very effectively.

According to a preferred implementation, the liquid cooled cable arrangement further comprises an insulating casing, which houses the first connecting element and the second connecting element. The insulating casing electrically insulates said connecting elements from each other. Additionally, the insulating casing may also house the positive contact element and/or the negative contact element. It also may electrically insulate said contact elements from each other. The insulating casing optionally may provide a connector housing insulating the connector from the surrounding.

According to a further implementation, a gap is formed between the insulating casing and each connecting element. Said gap preferably forms a fluid channel fluidically connecting the radial channel parts with the outer fluid channel of the charging cable. Alternatively, instead of a gap there may be provided a number of fluid channels or fluid grooves in the insulating casing that connect the radial channel parts with the outer fluid channel of the charging cable. By such a design the area of the connecting element which is cooled by the trough flowing coolant fluid advantageously can be very large.

The insulating casing particularly may be injection molded. It may be designed monolithically or it may consist of a plurality of distinct casing parts that are assembled to provide the connector housing. The insulating housing may be assembled with the other parts of the connector, in particular with its conducting parts as for example the first and/or the second connecting elements and/or the contacts. Alternatively, the insulating casing can be cast around or molded around the first connector element and/or the second connector element.

A very safe and simple way of electrically insulating the current leading elements of the connector can be achieved by providing the liquid coolant as a dielectric fluid.

In one implementation, the outer fluid channel of the charging cable provides a flow of coolant liquid from the charging station to the connector, specifically to the fluid channels provided in the first connecting element and in the second connecting element, and the inner fluid channel of the charging cable provides a flow of coolant liquid from the connector, specifically from the fluid channels of the first and the second connecting elements, back to the charging station. This ensures that the outside of the charging cable as well as the outside of the connector are at a low temperature, as they are in contact with fresh coolant liquid coming from the charging station, such that even under high loads a user can touch and handle the cable and the connector very comfortably. Additionally, the charging cable may comprise an outer layer of soft material for protection at very low temperatures.

The positive conductors and/or the negative conductors may be crimped and/or welded or soldered to the concerning connecting element. Additionally or alternatively, the contact elements may be connected to the concerning connecting element by a push-in mechanism, by screwing and/or by welding or soldering or brazing and/or by gluing.

The contacts may comprise pockets for thermocouples, pockets for contact springs close to tips of the contacts and/or stress relief openings at joints between different contacts and/or cooling channels connected to the fluid channels. The connecting elements may be directly or indirectly connected with the contact. Alternatively, the contacts and the connecting elements may be monolithically formed, in particular as a single block of copper.

The object is further solved by a method for liquid cooling a charging connector connected to a liquid cooled charging cable for high-power fast charging of electric vehicles, whereby the liquid cooled charging cable comprises several insulated positive conductors and several insulated negative conductors for supplying charging current and an inner fluid channel and an outer fluid channel surrounding the inner fluid channel, the inner fluid channel and the outer fluid channel together providing a supply path and a return path for liquid coolant, wherein the positive conductors and the negative conductors are arranged within the inner fluid channel, wherein the charging connector comprises at least a positive contact electrically connected to the positive conductor by a first connecting element and a negative contact electrically connected to the negative conductor by a second connecting element, wherein the first connecting element and the second connecting element each consist of a thermally conductive and electrically conductive material and are electrically isolated from each other, wherein the first connecting element and the second connecting element each are thermally connected to the inner channel and the outer channel of the charging cable, comprising the step of: conveying liquid coolant through the inner fluid channel and the outer fluid channel for removing heat generated during charging in the contacts.

The proposed method allows for advantageously reducing a maximum temperature on the contacts such that higher charging current can be used for charging the electric vehicle.

In a preferred implementation of the method, the first connecting element and the second connecting element each comprise fluid channels fluidically connecting the inner fluid channel and the outer fluid channel of the charging cable, comprising the step of conveying liquid coolant through the fluid channels of the first connecting element and the second connecting element for removing heat generated during charging in the contacts.

In a further preferred implementation of the method a gap is formed between the insulating casing and each connecting element, comprising the step of conveying liquid coolant through the gap for removing heat generated during charging in the contacts.

Further embodiments and advantages of the method are directly and unambiguously derived by the person skilled in the art from the system as described before.

BRIEF DESCRIPTION OF THE SEVERAL VIEWS OF THE DRAWING(S)

These and other aspects of the invention will be apparent from and elucidated with reference to the embodiments described hereinafter.

FIG. 1 shows a sectional view through a liquid cooled charging cable in a direction orthogonal to the longitudinal axis of the cable.

FIGS. 2A, 2B and 2C show an embodiment of a charging connector according to the invention in a sectional view taken along the longitudinal axis of the charging cable from different perspectives.

DETAILED DESCRIPTION OF THE INVENTION

Figure 3:
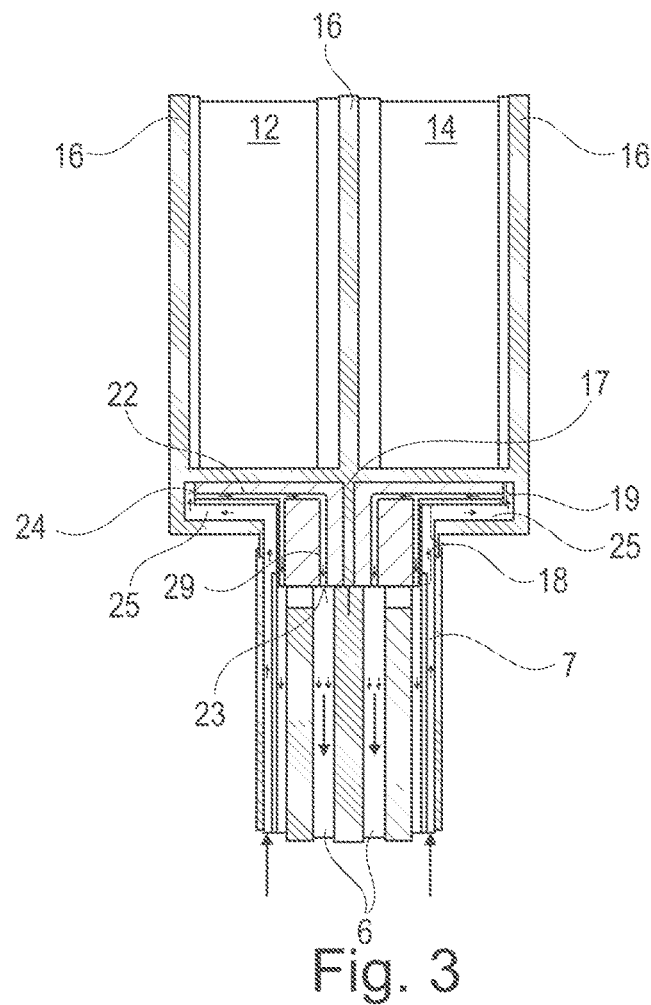
FIG. 3 shows the sectional view of FIG. 2A, wherein the flow of cooling fluid is indicated in the drawing.

The present disclosure describes a system and method comprising a charging connector and a liquid cooled charging cable, wherein the liquid cooled charging cable comprises several insulated positive conductors and several insulated negative conductors for supplying charging current and an inner fluid channel and an outer fluid channel surrounding the inner fluid channel, the inner fluid channel and the outer fluid channel together providing a supply path and a return path for liquid coolant, wherein the positive conductors and the negative conductors are arranged within the inner fluid channel.

FIGS. 2A-2C show a part of a liquid cooled cable arrangement according to a preferred implementation in a schematic sectional view along the longitudinal axis for high-power fast charging of electric vehicles. The arrangement comprises a charging connector 1 and a liquid cooled charging cable 2. FIG. 1 shows a sectional view through the liquid cooled charging cable 2 in a direction orthogonal to the longitudinal axis of the cable 2. The liquid cooled charging cable 2 comprises three positive conductors 3 and three negative conductors 4 for supplying charging current. It further comprises an insulated ground line 5, which is arranged in the middle of the section of the charging cable 2. The positive conductors 3, the negative conductors 4 and the ground line 5 are each individually insulated to prevent mutual contact.

The charging cable further comprises an inner fluid channel 6 and an outer fluid channel 7 surrounding the inner fluid channel 6. The inner fluid channel 6 and the outer fluid channel 7 together provide a supply path 8 and a return path 9 for a liquid coolant. The inner fluid channel 6 is enclosed by a tight sheath 10, which at the same time divides the inner fluid channel 6 from the outer fluid channel 7. The outer fluid channel 7 again is enclosed by an outer sheath 11 surrounding the entire cable 2. The three positive conductors 3, the three negative conductors 4 and the ground line 5 are each arranged within the inner fluid channel 6. The ground line 5 connection is not dealt with in detailed in this disclosure, as the charging cable 2 fits to a standardized connector layout.

The charging connector 1 comprises a positive contact 12, a first connecting element 13, a negative contact 14 and a second connecting element 15 for connecting to respective socket of an electric vehicle, not shown. The positive contact 12 is electrically connected to the positive conductors 3 by the first connecting element 13. The negative contact 14 is electrically connected to the negative conductors 4 by the second connecting element 15. The first connecting element 13 and the second connecting element 15 each are copper blocks. The connection between the positive conductors 3/negative conductors 4 and the first connecting element 13/second connecting element 15 needs to be reliable, but does not present high electric insulation requirements since the conductors 3, 4 insulation prevents electrical contact of the positive and the negative conductors 3, 4. Since at the respective connection to the copper blocks of the first connecting element 13 and the second connecting element 15, respectively, the conductors 3,4 position is fixed, touching of the conductors 3, 4 is prevented in the area. The space for connection (e.g. soldered) can be formed inside of the copper blocks of the first connecting element 13 and the second connecting element 15 themselves.

The first connecting element 13 and the second connecting element 15 each are embodied/arranged in an electrically insulating casing 16. The insulating casing 16 prevents accessibility of the live parts, i.e. to those parts energized during charging, from outside. Further, the insulating casing 16 provides an insulating separation of the first connecting element 13 and the second connecting element 15 by an insulating wall 17 arranged in between. This separation, i.e. the creep-age distance between the first and the second connecting elements 13, 15 advantageously is as large as possible.

The first connecting element 13 and the second connecting element 15 are identically formed, such that the following description of the first connecting element 13 also is applicable to the second connecting element 15. The first connecting element 13 consist of a charging cable mating part 18 for connection with the charging cable 2 and a contact mating part 19 for connection with the concerning contact 12, 14. This may, in principle, be achieved also by having connecting element 13 and 12 made from one solid element. Contacts 12 may also be replace-able, in which case they are two different parts. It further comprises fluid channels 20, which fluidly connect the inner fluid channel 6 and the outer fluid channel 7 of the charging cable 2. Each fluid channel 20 comprises an axial channel part 21 and a radial channel part 22. Each axial channel part 21 is open towards an axial surface 23 of the connecting element 13 located at its charging cable mating part 18. Further, each radial channel part 22 is open towards a radial surface 24 of the connecting element 13 located at its contact mating part 19. The axial channel part 21 and the radial channel part 22 of each fluid channel 20 are fluidly connected to each other. By this way, there is provided a flow path for coolant liquid, which is described later.

The charging cable mating part 18 and the contact mating part 19 each are formed essentially as half-cylinders, wherein the contact mating part 19 has a wider radial extension than the charging cable mating part 18. Therefore, there is a large contact area between the concerning contact 12, 14 and the contact mating part 19, such that a very effective heat transfer from the contact 12, 14 to the connecting element 13 can be established. The insulating casing 16 is slightly larger than the first connecting element 13 and the second connecting element 15, such that there is a gap 25 between the first and second connecting elements 13, 15 and the insulating casing 16, which gap 25 provides a fluid channel 25 fluidly connecting the radial channel parts 22 with the outer fluid channel 7 of the charging cable 2.

The entire flow path for the coolant fluid is as follows (see in particular FIG. 2, section A and FIG. 3): The coolant fluid flows first along the whole length of the charging cable 2 through the outer fluid channel 7 of the cable 2. At the connection of the charging cable 2 to the charging connector 1, the coolant fluid enters into the gap 25 and continues to flow along the outer surfaces of the first and second connecting elements 13, 15. At the radial surface 24 the fluid enters into the concerning radial channel part 22 and flows through the radial channel parts 22 and the axial channel parts 21 of the fluid channels 20. The fluid exits the axial channel parts 21 at the axial surface 23 of the charging cable mating part 18 and enters into the inner fluid channel 6 of the charging cable 2. Therefore, in this ex-ample, the outer fluid channel 7 provides a supply path for the coolant fluid, while the inner fluid channel 6 provides a return path for the coolant fluid.

As the flow path first is through the outer fluid channel 7, the fresh and cool coolant fluid first cools the outer surface of the charging cable 2, such that a very good injury prevention for a user is achieved. The highest thermal duty stems from the conductor cooling, which can be handled very easy due to the large con-tact area between the connecting elements 13 15 and the contacts 12, 14, such that heat generated in the contacts 12, 14 during charging can effectively be removed by the liquid coolant. The highest heat flux is expected at the base of the connector 1. The highest temperature of the cooling fluid is to be expected at the return to the charging post, which is uncritical, as the hot cooling fluid is contained in the inner fluid channel 6 of the charging cable and is therefore effectively shielded from the user.

Figure 4:
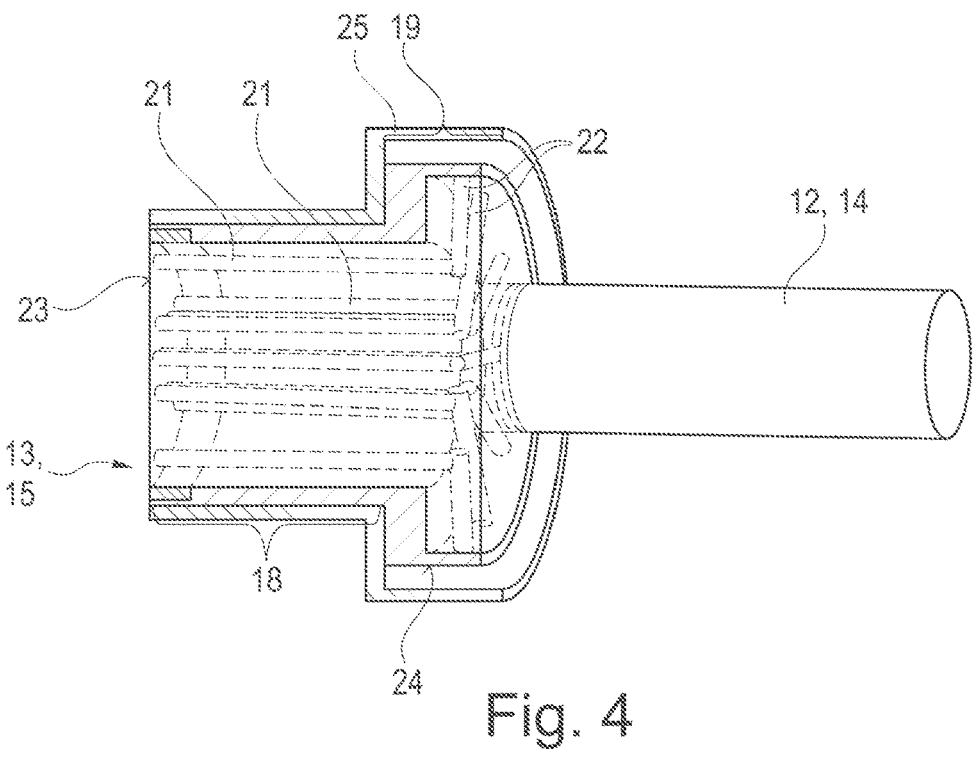
FIG. 4 shows a partially cut perspective view of an embodiment of a charging connector according to the invention.
Figure 5:
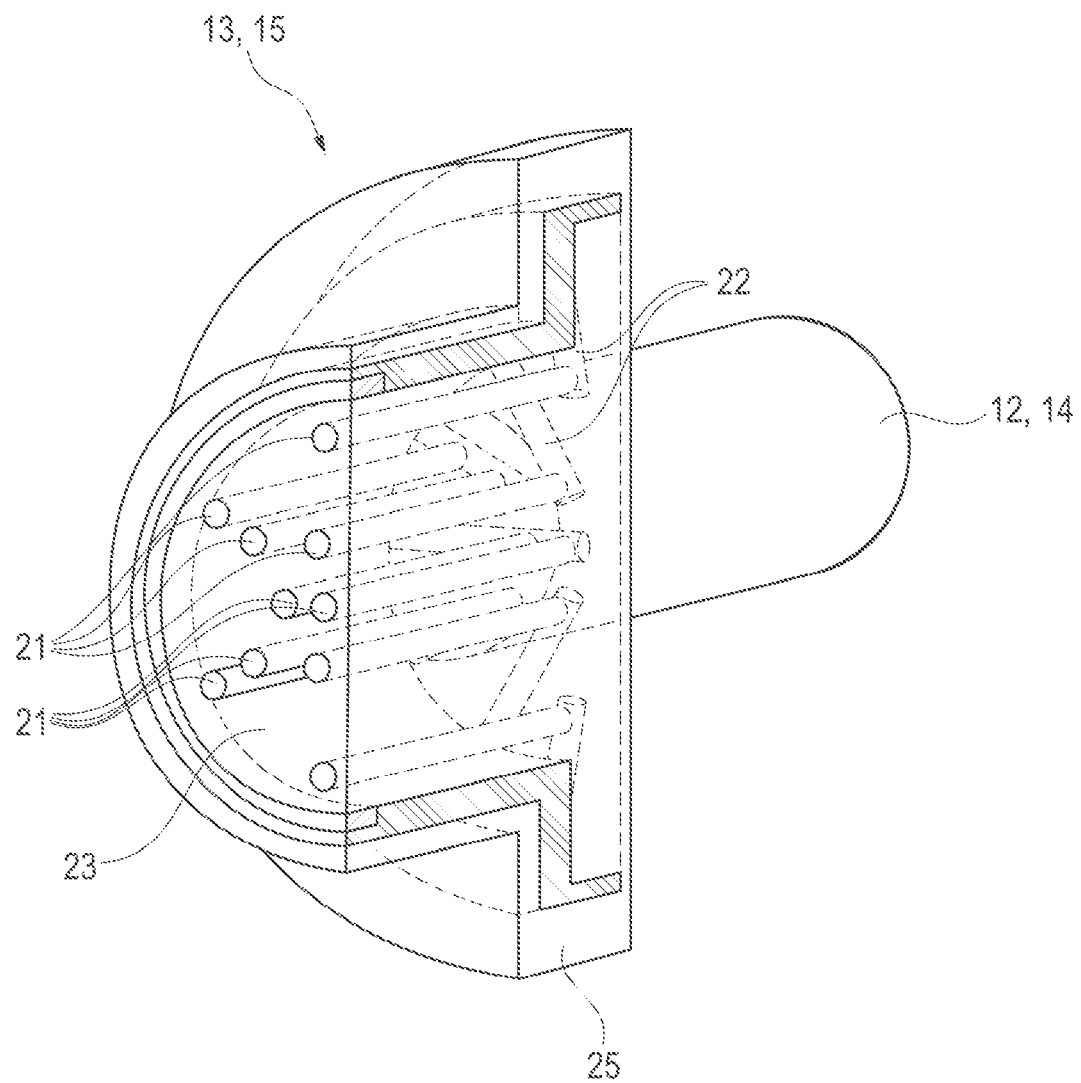
FIG. 5 shows the charging connector of FIG. 4 from a different point of view.

FIG. 4 and FIG. 5 show a partially cut perspective view of an example of the connector 1, in principle. The set of axial/radial channel parts 21, 22 in the copper block of the connecting element 13, 15 is visualized. The number, position and diameter of the channels 21, 22 is a matter of optimization of thermal performance, manufacturing costs, as well as space constraints due to interface of the channels 21, 22 to the cable 2.

While the invention has been illustrated and described in detail in the drawings and foregoing description, such illus-tration and description are to be considered illustrative or exemplary and not restrictive; the invention is not limited to the dis-closed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these mea-sures cannot be used to advantage. Any reference signs in the claims should not be construed as limiting scope.

REFERENCE SIGNS LIST 1 charging connector
2 charging cable
3 positive conductors
4 negative conductors
5 ground line
6 inner fluid channel
7 outer fluid channel
8 supply path
9 return path
10 sheath
11 sheath
12 positive contact
13 first connecting element
14 negative contact
15 second connecting element
16 insulating casing
17 insulating wall
18 charging cable mating part
19 contact mating part
20 fluid channel
21 axial channel part
22 radial channel part
23 axial surface
24 radial surface
25 gap All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A liquid cooled cable arrangement for high-power fast charging of electric vehicles, comprising:
 a charging connector and a liquid cooled charging cable, wherein the liquid cooled charging cable comprises several insulated positive conductors and several insulated negative conductors for supplying charging current, an inner fluid channel, and an outer fluid channel surrounding the inner fluid channel, the inner fluid channel and the outer fluid channel together providing a supply path and a return path for liquid coolant;
 wherein the positive conductors and the negative conductors are arranged within the inner fluid channel;
 wherein the charging connector comprises at least a positive contact electrically connected to the positive conductors by a first connecting element and a negative contact electrically connected to the negative conductor by a second connecting element;
 wherein the first connecting element and the second connecting element each includes a thermally conductive and electrically conductive material, the first and second connecting elements being electrically isolated from each other;
 wherein the first connecting element and the second connecting element each is thermally connected to the inner channel and to the outer channel of the charging cable such that heat generated in the contacts during charging can be removed by the liquid coolant; and
 wherein the fluid channels in at least one of the first connecting element and the second connecting element include an axial channel part and a radial channel part, wherein the axial channel part is open towards an axial surface of the connecting element, the radial channel part is open towards a radial surface of the connecting element and the axial channel part and the radial channel part are fluidly connected to each other.

2. The liquid cooled cable arrangement of claim 1, wherein the first connecting element and the second connecting element each comprises the fluid channels fluidly connecting the inner fluid channel and the outer fluid channel of the charging cable such that heat generated in the contacts during charging can be removed by the liquid coolant.

3. The liquid cooled cable arrangement of claim 1, wherein the first connecting element and the second connecting element each includes a charging cable mating part for connection with the charging cable, and a contact mating part for connection with the respective contact, wherein the contact mating part has a wider radial extension than the charging cable mating part.

4. The liquid cooled cable arrangement of claim 1, further comprising an insulating casing that houses the first connecting element and the second connecting element, the insulating casing disposed to electrically insulate said connecting elements from each other.

5. The liquid cooled cable arrangement of claim 4, wherein the insulating casing is disposed to house the positive contact and the negative contact and electrically insulates said contacts from each other.

6. The liquid cooled cable arrangement of claim 4, wherein the insulating casing is disposed to provide a connector housing insulating the connector from a surrounding environment.

7. The liquid cooled cable arrangement of claim 4, wherein a gap is formed between the insulating casing and each connecting element, which gap forms the fluid channels fluidly connecting the radial channel parts with the outer fluid channel of the charging cable.

8. The liquid cooled cable arrangement of claim 4, wherein the insulating casing is injection molded.

9. The liquid cooled cable arrangement of claim 1, wherein the liquid coolant is a dielectric fluid.

10. The liquid cooled cable arrangement of claim 1, wherein the first plurality of positive conductors and the second plurality of negative conductors are crimped and/or welded or soldered to a respective connecting element.

11. The liquid cooled cable arrangement of claim 1, wherein the contacts are connected to a respective connecting element by a push-in mechanism, by screwing and/or by welding or soldering or brazing and/or by gluing.

12. The liquid cooled cable arrangement of claim 1, wherein the contacts comprise at least one of pockets for thermocouples, pockets for contact springs close to tips of the contacts, stress relief openings at joints between different contacts, and cooling channels connected to the fluid channels.

13. A method for liquid cooling a charging connector connected to a liquid cooled charging cable for high-power fast charging of electric vehicles, comprising:
 providing the liquid cooled charging cable, the liquid cooled charging cable comprising:
 several insulated positive conductors and several insulated negative conductors for supplying charging current and an inner fluid channel and an outer fluid channel surrounding the inner fluid channel, the inner fluid channel and the outer fluid channel together providing a supply path and a return path for liquid coolant;
 wherein the positive conductors and the negative conductors are arranged within the inner fluid channel;
 wherein the charging connector comprises at least a positive contact electrically connected to the positive conductors by a first connecting element and a negative contact electrically connected to the negative conductors by a second connecting element;
 wherein the first connecting element and the second connecting element each includes a thermally conductive and electrically conductive material and are electrically isolated from each other;
 wherein the first connecting element and the second connecting element each is thermally connected to the inner channel and to the outer channel of the charging cable;
 wherein the fluid channels in at least one of the first connecting element and the second connecting element include an axial channel part and a radial channel part, wherein the axial channel part is open towards an axial surface of the connecting element, the radial channel part is open towards a radial surface of the connecting element and the axial channel part and the radial channel part are fluidly connected to each other; and
 conveying liquid coolant through the inner fluid channel, the connecting elements and the outer fluid channel for removing heat generated during charging in the contacts.

14. The method of claim 13, wherein the first connecting element and the second connecting element each comprises the fluid channels fluidly connecting the inner fluid channel and the outer fluid channel of the charging cable; and wherein the method further includes conveying liquid coolant through the fluid channels of the first connecting element and the second connecting element for removing heat generated during charging in the contacts.

15. The method of claim 13, wherein the liquid cooled charging cable includes an insulating casing, wherein a gap is formed between the insulating casing and each connecting element, and wherein the method further includes conveying liquid coolant through the gap for removing heat generated during charging in the contacts.

\* \* \* \* \*